US012426130B2

(12) United States Patent
Wang

(10) Patent No.: US 12,426,130 B2
(45) Date of Patent: Sep. 23, 2025

(54) ATOMIZING UNIT AND ATOMIZING DEVICE

(71) Applicant: SHENZHEN HUACHENGDA PRECISION INDUSTRY CO. LTD., Guangdong (CN)

(72) Inventor: Xiaodie Wang, Guangdong (CN)

(73) Assignee: SHENZHEN HUACHENGDA PRECISION INDUSTRY CO. LTD., Shenzhen (CN)

( * ) Notice: Subject to any disclaimer, the term of this patent is extended or adjusted under 35 U.S.C. 154(b) by 591 days.

(21) Appl. No.: 17/915,477

(22) PCT Filed: Nov. 20, 2020

(86) PCT No.: PCT/CN2020/130561
§ 371 (c)(1),
(2) Date: Sep. 29, 2022

(87) PCT Pub. No.: WO2022/104727
PCT Pub. Date: May 27, 2022

(65) Prior Publication Data
US 2023/0136231 A1 May 4, 2023

(51) Int. Cl.
*H05B 3/46* (2006.01)
*H05B 3/06* (2006.01)

(52) U.S. Cl.
CPC ................. *H05B 3/46* (2013.01); *H05B 3/06* (2013.01); *H05B 2203/016* (2013.01); *H05B 2203/021* (2013.01)

(58) Field of Classification Search
CPC ...... H05B 3/46; H05B 3/06; H05B 2203/016; H05B 2203/021; H05B 2203/003; H05B 3/42; H05B 2203/012; H05B 3/0019; H05B 3/03; H05B 3/40; A24F 40/10; A24F 40/46; A24F 47/00
See application file for complete search history.

(56) References Cited

U.S. PATENT DOCUMENTS 10,602,778 B2 * 3/2020 Hu ........................ A61M 11/042
2018/0338536 A1 11/2018 Hu et al.

FOREIGN PATENT DOCUMENTS

CN 204273230 U 4/2015
CN 209235000 U 8/2019
(Continued)

*Primary Examiner* — Robert G Bachner

(57) ABSTRACT

The present invention provides an atomizing unit and an atomizing device. The atomizing unit includes a tubular heating assembly and a liquid conducting member. The liquid conducting member is wrapped around an outer periphery of the tubular heating assembly or fitted to an inner peripheral surface of the tubular heating assembly. The tubular heating assembly includes an annular connecting portion, at least two heating portions connected to one end surface of the connecting portion and arranged around the end surface, and electrode portions connected to one end of the heating portions away from the connecting portion. Each side of two opposite sides of one heating portion faces to a corresponding side of its adjacent heating portion with a gap therebetween. The at least two heating portions are connected in series through the connecting portion. The atomizing unit has a high structural strength and is convenient for assembly.

20 Claims, 12 Drawing Sheets

(56) References Cited

FOREIGN PATENT DOCUMENTS

| | | | |
|---|---|---|---|
| CN | 111134364 | A | 5/2020 |
| CN | 211509306 | U | 9/2020 |
| CN | 111887479 | A | 11/2020 |

* cited by examiner

ATOMIZING UNIT AND ATOMIZING DEVICE

FIELD

The present invention relates to the technical field of electronic heating atomization, and more specifically, to an atomizing unit and an atomizing device.

BACKGROUND

The heating atomization can disperse liquid into smaller particles, making the liquid molecules more dispersed in space, and is widely used in the fields of medical, agricultural, household appliances, electronic consumer goods and the like. The heating atomization is easy to implement, and can atomize most liquids into particles, thus has been widely used in recent years. The innovation of the heating member, as a core component of the heating atomization, is particularly important.

At present, the most widely used heating members in the field of the heating atomization are the cylindrical heating members, which are mainly divided into two types: one is the cylindrical heating member formed by spiraling a heating wire, and the other is the tubular heating member by wounding a grid shaped heating sheet into a C-shape. The two electrodes of the two types of the heating members are respectively arranged at two opposite ends of the heating member, which brings the following problems: 1, the electrodes at the two ends need to be led out to a same end through electrode leads, during design, the leads occupy space, and the liquid conducting material outside the heating member needs to evade the position of the leads when wrapping and matching, which makes it difficult to be assembled; 2, the C-shaped tubular heating member is not a whole circular in the circumferential direction and has insufficient radial support, which is easy to be deformed and thus causes a poor contact with the liquid conducting material.

In addition, the heating value of the current cylindrical heating member is not easy to be adjusted, and is easy to be changed in size during production and assembly, which affects the consistency of the product.

SUMMARY

A technical problem to be solved by the present invention is, to provide an improved atomizing unit and an atomizing device that are easy to be assembled and have high structural strength.

A technical solution adopted by the present invention to solve the technical problem is to provide an atomizing unit, including a tubular heating assembly and a liquid conducting member; wherein the liquid conducting member is wrapped around an outer periphery of the tubular heating assembly or fitted to an inner peripheral surface of the tubular heating assembly;

the tubular heating assembly includes an annular connecting portion, at least two heating portions connected to one end surface of the connecting portion and arranged around the end surface, and electrode portions connected to one end of the heating portions away from the connecting portion; and each side of two opposite sides of one heating portion faces to a corresponding side of its adjacent heating portion with a gap therebetween; and the at least two heating portions are connected in series through the connecting portion.

Preferably, each heating portion is provided with a hollow structure, and the hollow structure includes a plurality of through slots and/or a plurality of notches spaced along a length direction of the heating portion, to enables the heating portion to form at least one heating trace.

Preferably, the heating trace is in a circuitous bent shape, a polyline shape or a wave shape.

Preferably, in the length direction of the heating portion, the widths of the through slot and/or the notch located in the middle of the heating trace are larger than the widths of the through slot and/or the notch located at two ends of the heating trace.

Preferably, the heating trace is provided with a plurality of spaced through hole.

Preferably, the electrode portions are provided with at least one hollow portion.

Preferably, the tubular heating assembly further includes electrode leads connected to the electrode portions.

Preferably, the liquid conducting member includes a liquid conducting tubular body, and an annular step projecting on an outer periphery of one end of the liquid conducting tubular body; and the liquid conducting tubular body extends in the tubular heating assembly, and the electrode portions of the tubular heating assembly are abutted against the annular step or partially embedded in the annular step.

Preferably, the atomizing unit further includes a supporting assembly supporting the tubular heating assembly; and the supporting assembly includes a supporting base and a supporting member, the supporting base is sleeved on the electrode portions of the tubular heating assembly, and the supporting member extends in the tubular heating assembly and is inserted on the supporting base; and the liquid conducting member is wrapped around the outer periphery of the tubular heating assembly and abutted on the supporting base.

Preferably, the supporting base includes a base body, the base body is provided with a central through hole running through two opposite surfaces thereof, and at least two perforations spaced and surrounding an outer periphery of the central through hole; and one end of the supporting member is inserted in the central through hole, and each electrode portion is inserted in the corresponding perforation.

Preferably, the supporting member includes a barrel body with an open end and a closed end opposite to the open end; the open end of the barrel body is inserted in the central through hole of the supporting base and is located in the electrode portions of the tubular heating assembly; the closed end of the barrel body is in the tubular heating assembly and faces the heating portions, and is located in the junction of the electrode portion and the heating portion or in an end of the heating portion; and a side wall of the closed end of the barrel body is provided with at least one vent hole configured to communicate an atomization passage of the tubular heating assembly with an internal passage of the barrel body.

Preferably, the atomizing unit further includes a sleeve sleeved around the liquid conducting member and the supporting base; and a side wall of the sleeve is provided with at least one liquid conducting hole that runs through an inner wall surface and an outer wall surface thereof.

The present invention further provides an atomizing device, including the atomizing unit of any one of the above, a shell that is hollow, and a base; wherein, one end of the shell is provided with an air outlet, and another opposite end of the shell is opened to form an open end; and the base is fitted to the open end of the shell, and the atomizing unit is disposed in the shell and inserted on the base; and the shell is provided therein with an air duct communicated between the air outlet and the atomizing unit, and a liquid storage chamber located on an outer periphery of the air duct and in fluid communication with the liquid conducting member of the atomizing unit.

Preferably, the base includes a foundation base that is hard and a sealing base matched with the foundation base; and the foundation base is provided with an installation slot that is inward concave, and an air inlet penetrating a bottom surface of the installation slot; the atomizing unit is inserted in the installation slot; the sealing base is sleeved on the foundation base, and a side surface of the sealing base located in the installation slot is provided with at least one protruding first sealing rib, and a side surface of the sealing base located at an outer circumference of the foundation base is provided with at least one protruding second sealing rib.

Preferably, the atomizing device further includes a sealing seat; and an end of the air duct facing the atomizing unit is inserted on an end of the atomizing unit facing the air outlet, and the sealing seat is fitted to the end of the atomizing unit facing the air outlet, and seals a matching gap between the atomizing unit and the air duct.

Preferably, the atomizing device further includes a bottom case, and the bottom case is sleeved outside the base and connected with the shell, to form an integral housing together with the shell.

Preferably, the atomizing device further includes two electrodes inserted on the base; and the electrodes are electrically connected with the electrode portions of the atomizing unit.

The atomizing unit of the present invention adopts the tubular heating assembly as a heating element and is tubular in overall shape, and at least two relatively independent heating portions are connected into a whole and form a series connection through the connecting portion, which not only improves the structural strength of the heating assembly, but also has a larger resistance value compared with other heating elements of the same volume; the electrode portions are located at the same end of the heating assembly, which is convenient for assembly and connection with the battery or other power supply.

BRIEF DESCRIPTION OF THE DRAWINGS

Subject matter of the present invention will be described in even greater detail below based on the exemplary figures. In the accompanying drawings.

DETAILED DESCRIPTION

For better understanding of the technical features, objects and effects of the present invention, the specific embodiments of the present invention will be described in detail with reference to the accompanying drawings.

As shown in FIGS. 1 to 4, an atomizing unit 2 of the present invention includes a tubular heating assembly 100 and a liquid conducting member 200. The liquid conducting member 200 may surround an outer circumference of the tubular heating assembly 100 or disposed on an inner circumference surface of the tubular heating assembly 100 to conduct the adsorbed atomized liquid to the tubular heating assembly 100 for heating to generate smoke.

Figure 1:
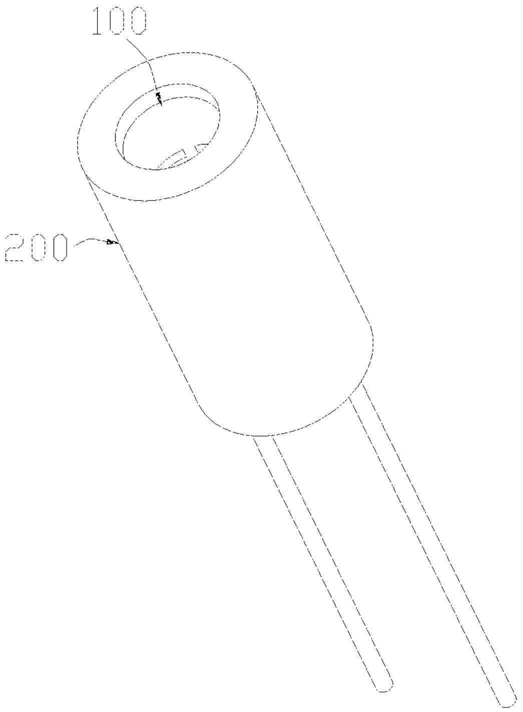
FIG. 1 is a structural diagram of an atomizing unit in an embodiment of the present invention.
Figure 2:
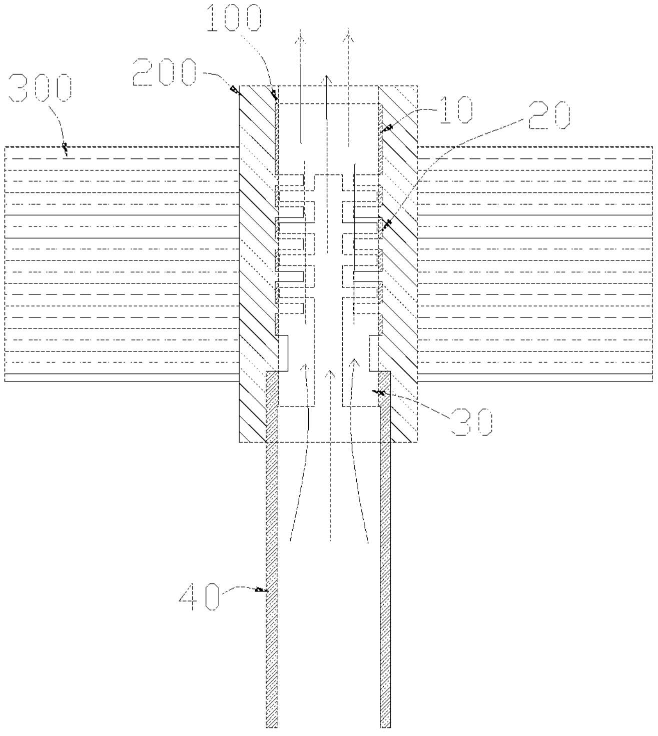
FIG. 2 is a sectional view of the atomizing unit in FIG. 1 cooperated with an atomized liquid.

As shown in FIGS. 1 and 2, in the atomizing unit 2 in a first embodiment of the present invention, the liquid conducting member 200 is wrapped around the outer periphery of the tubular heating assembly 100. The atomized liquid 300 is adsorbed from the outer periphery of the liquid conducting member 200, and then conducted to the tubular heating assembly 100, to be heated and atomized to generate smoke. Since the tubular heating assembly 100 is tubular as a whole, its inner passage forms an atomization passage, and the smoke generated by heating and atomizing is output along the atomization passage, as shown by the arrows in FIG. 2.

Figure 3:
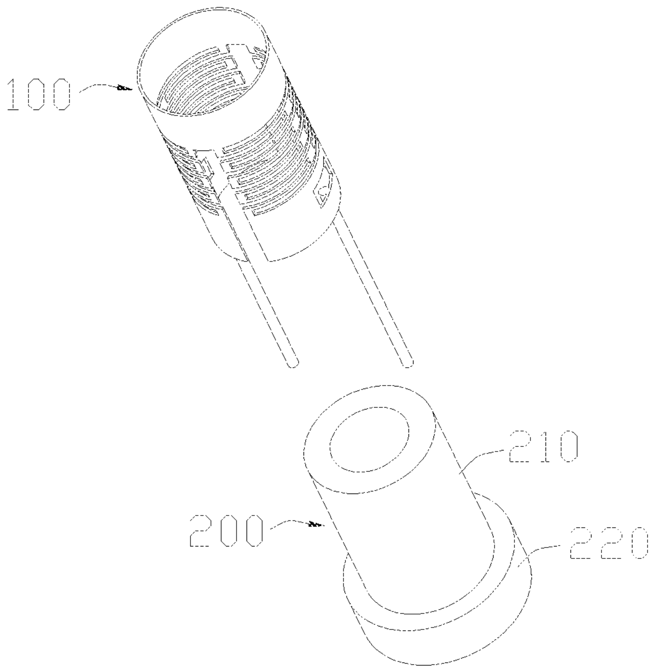
FIG. 3 is an exploded view of an atomizing unit in a second embodiment of the present invention.
Figure 4:
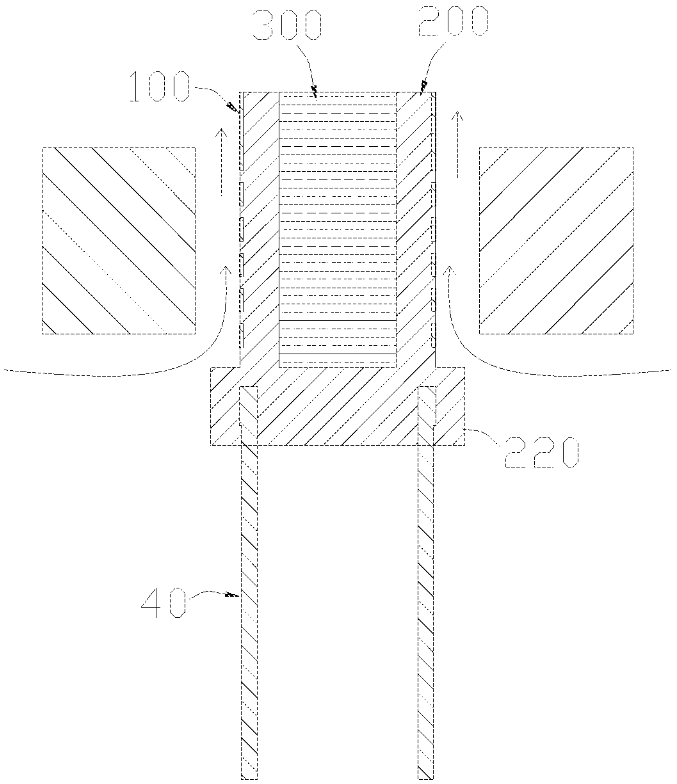
FIG. 4 is a sectional view of the atomizing unit in FIG. 3 cooperated with an atomized liquid.

As shown in FIGS. 3 and 4, in the atomizing unit 2 in a second embodiment of the present invention, the liquid conducting member 200 is matched on the inner peripheral surface of the tubular heating assembly 100. The inner periphery of the liquid conducting member 200 may be used as a liquid storage chamber to store the atomized liquid 300. A gap for air to flow is left between the outer periphery of the tubular heating assembly 100 and a fixing member configured for installation and fixation. The atomized liquid 300 is adsorbed from the inner periphery of the liquid conducting member 200, and then conducted to the tubular heating assembly 100 to be heated and atomized to generate smoke, which is output along the outer peripheral surface of the tubular heating assembly 100, as shown by the arrows in FIG. 4.

In the atomizing unit 2 of the present invention, the cross-sectional shape of the tubular heating assembly 100 may be a circle or a polygon or other shape.

Figure 5:
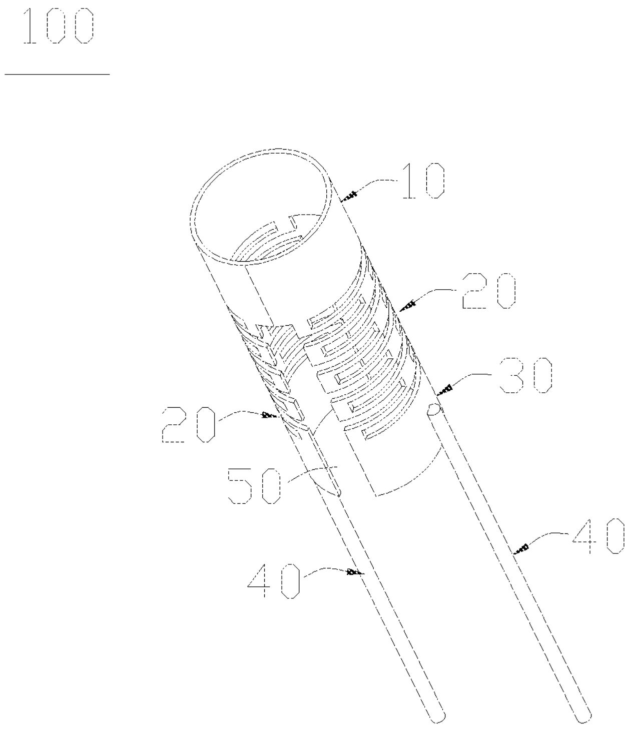
FIG. 5 is a three-dimensional structural diagram of a tubular heating assembly in a first embodiment of the present invention.

Referring to FIGS. 4 and 5, the tubular heating assembly 100 includes an annular connecting portion 10, at least two heating portions 20 connected to one end surface of the connecting portion 10 and arranged around the end surface, electrode portions 30 each connected to the end of the heating portion 20 away from the connecting portion 10, and electrode leads 40 each connected to the electrode portion 30. In the whole axial direction of the tubular heating assembly 100, the connecting portion 10 and the electrode portion 30 are respectively located on two opposite ends of the tubular heating assembly 100, and the heating portion 20 is located in the middle and connected between the connecting portion 10 and the electrode portion 30.

The connecting portion 10 has two opposite annular end surfaces, the heating portion 20 is connected with one end surface of the connecting portion 10, and is arranged around the end surface. The at least two heating portions 20 are spaced (not connected). The electrode portions 30 are respectively connected to the end of the heating portions 20 away from the connecting portion 10, and the electrode portions 30 are also spaced and respectively correspond to positive and negative electrodes. Each electrode portion 30 is connected with an electrode lead 40, for connecting to the positive electrode and or the negative electrode of a battery or other power supply.

Each heating portion 20 has two opposite sides, and each side faces to the corresponding side of its adjacent heating portion 20 with a gap 50 therebetween. The at least two heating portions 20 are connected in series through the connecting portion 10, so as to be connected to the external power supply in series, and the resistance value can be higher than that of other heating members of the same volume.

In the whole tubular heating assembly 100, the connecting portion 10 connects the at least two relatively independent heating portions 20 to be a whole structure, to improve the strength of the tubular structure of the heating assembly. The at least two electrode portions 30 are located at the same end of the heating assembly, which is convenient for the assembly in the atomizing device and the connection with the battery.

The heating portion 20 is provided with a hollow structure, which enables the heating portion 20 to form a heating structure such as a heating trace 21, the heating trajectory is long and the heating area is reduced, and the resistance is larger compared with the connecting portion 10 and the electrode portion 30, so that more heat is generated when powered on. In addition, the heating value of the heating trace 21 may be adjusted by adjusting its width, spacing, etc.

Further, the hollow structure may include a plurality of through slots 201 and/or a plurality of notches 202 spaced disposed along the length direction of the heating portion 20. The arrangement of the hollow structure enables the heating portion 20 to form at least one heating trace 21.

Figure 6:
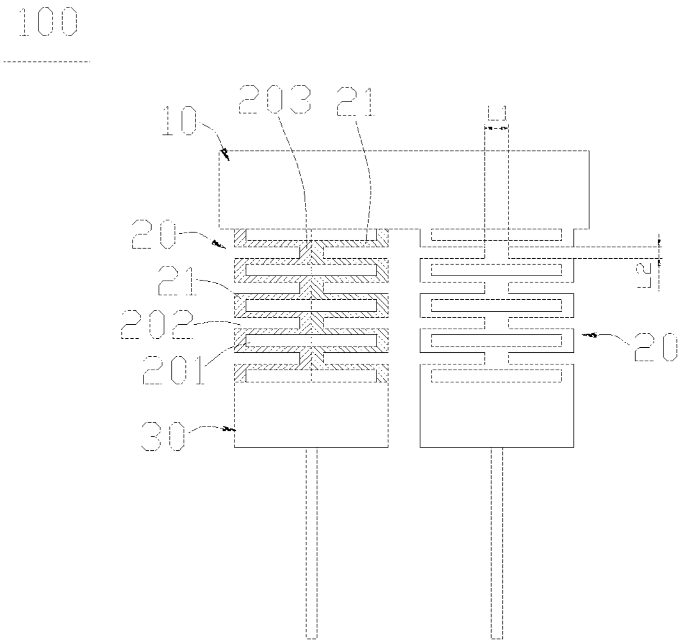
FIG. 6 is a structural diagram of the tubular heating assembly in FIG. 5 when unfolded.

In the tubular heating assembly 100 in the first embodiment, as shown in FIGS. 5 and 6, the tubular heating assembly 100 includes two symmetrically disposed heating portions 20. One end of each heating portion 20 away from the connecting portion 10 is connected with an electrode portion 30. The hollow structure on each heating portion 20 includes a plurality of through slots 201 and a plurality of notches 202. Wherein, the plurality of through slots 201 are spaced along the length direction of the heating portion 20. Two notches 202 are arranged between each two adjacent through slots 201, and the two notches 202 are spaced and opposite. The arrangement of the through slots 201 and the notches 202 makes the heating portion 20 include a plurality of heating rings that are sequentially connected in the length direction of the heating portion 20, and the partition 203 between the opposite two notches 202 forms a connecting structure for connecting the heating rings.

Dividing the heating portion 20 according to its central line, the heating portion 20 may be divided into two heating traces 21 with the central line as the symmetry axis, that is, the two heating traces 21 are connected and symmetrical. The two heating traces 21 are connected in parallel. Each heating trace 21 may be in a circuitous bent shape as shown in FIG. 6, or in other shape such as a polyline shape or a wave shape.

In consideration of the overall strength of the heating assembly, the width L1 of the partition 203 (between the two opposite notches 202) located on the central line of the heating portion 20 is preferably greater than or equal to two times the width L2 of the notch 202.

In the tubular heating assembly 100, the wall thickness of the heating portion is 0.03 mm to 0.5 mm. Alternatively, the tubular portion of the tubular heating assembly 100 (including the connecting portion 10, the heating portions 20 and the electrode portions 30) is an integrated structure, with an overall wall thickness of 0.03 mm to 0.5 mm.

The tubular heating assembly 100 may be made of stainless steel alloy, nickel chromium alloy, iron chromium aluminum alloy, titanium and titanium alloy, nickel base alloy, hastelloy alloy or other metal material, by cutting (specific wire cutting, laser cutting, spark cutting, etc.) or other processing method.

As an option, the tubular portion of the tubular heating assembly 100 (including the connecting portion 10, the heating portions 20 and the electrode portions 30) may use a tubular body as a substrate, to form the connecting portion 10, the heating portions 20 and the electrode portions 30 on it by cutting or other processing method, and to form the heating trace 21 by processing the hollow structure on the heating portion 20. Alternatively, the tubular portion of the tubular heating assembly 100 (including the connecting portion 10, the heating portions 20 and the electrode portions 30) may use a metal sheet as the substrate, to form a flat connecting portion 10, flat heating portions 20 and flat electrode portions 30 on it by cutting or other processing method, and to form the heating trace 21 by processing the hollow structure on the heating portion 20, then curve the processed metal sheet into a tube, and weld the two ends of the connecting portion 10 together.

In addition, according to the required diameter, the overall diameter of the heating assembly may be adjusted by increasing or decreasing the number of the heating portions 20 and the width of the heating portion 20 of the tubular heating assembly 100.

Figure 7:
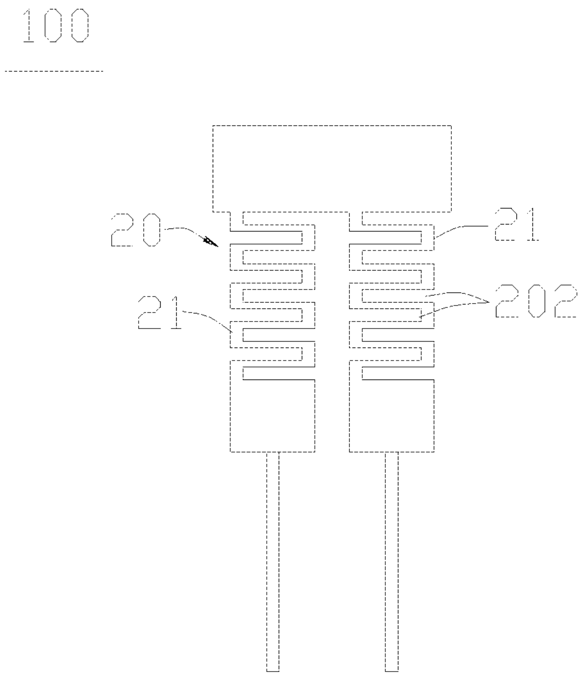
FIG. 7 is a structural diagram of a tubular heating assembly when unfolded in a second embodiment of the present invention.

In the tubular heating assembly 100 in the second embodiment, as shown in FIG. 7, the hollow structure on the heating portion 20 includes a plurality of notches 202 spaced and interlaced along the length direction of the heating portion

20. The arrangement of the plurality of notches 202 makes heating portion 20 form one heating trace 21.

The heating portion 20 provided with one heating trace 21, compared with the heating portion 20 which is provided with two or more heating traces 21, is beneficial to reduce the width and form a heating assembly with a smaller diameter.

Figure 8:
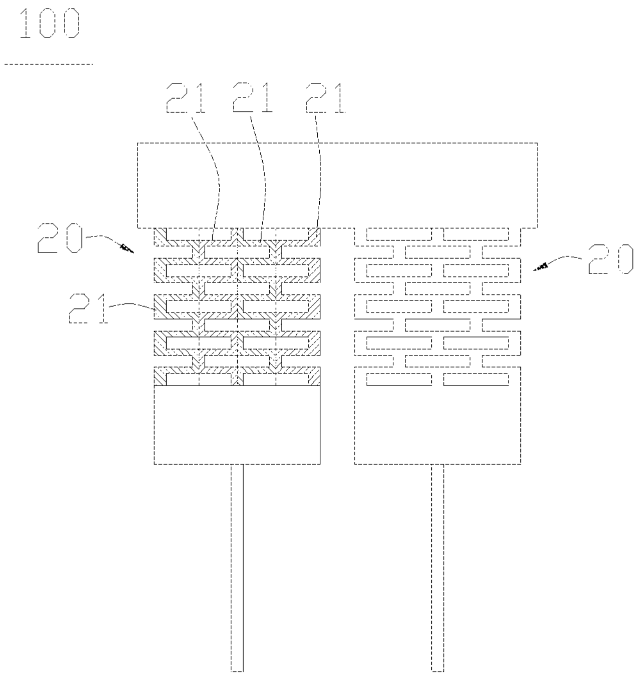
FIG. 8 is a structural diagram of a tubular heating assembly when unfolded in a third embodiment of the present invention.

As shown in FIG. 8, the tubular heating assembly 100 in the third embodiment differs from the first embodiment in that: the arrangement of the hollow structure on each heating portion 20 makes the heating portion 20 form two heating areas that are connected and symmetrical to each other, and each heating area includes two heating traces 21 that are connected and symmetrical. Therefore, each heating portion 20 has four heating traces 21, which are sequentially connected in the width direction of the heating portion 20. The heating portion 20 in this embodiment, compared with the tubular heating assembly 100 in the first and second embodiments, is applicable to the tubular heating assembly with a larger diameter requirement.

Understandably, for the tubular heating assembly 100 with the same diameter requirement, the heating portion 20 can also form one or more heating traces 21 according to the requirements for heating value, atomization effect, etc.

With reference to FIGS. 5-8, in the tubular heating assembly 100 of any one of the first to third embodiments, the widths of the through slots 201 and the notches 202 are uniformly arranged, that is, on the heating portion 20, the widths of the plurality of through slots 201 are equal, the widths of the plurality of notches 202 are equal, and the widths of the through slot 201 and the notch 202 may also be equal.

Figure 9:
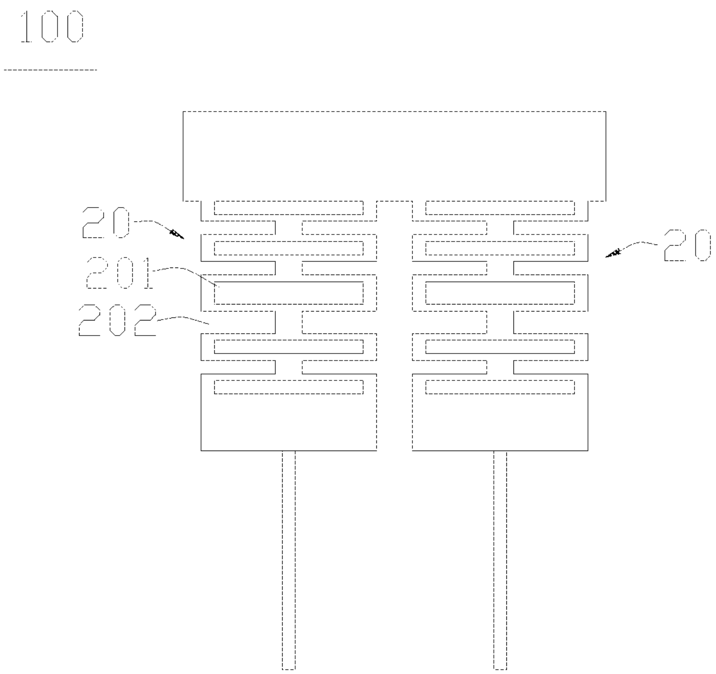
FIG. 9 is a structural diagram of a tubular heating assembly when unfolded in a fourth embodiment of the present invention.

The heating assembly 100 in the fourth embodiment, as shown in FIG. 9, differs from the first to third embodiments in that: in the length direction of the heating portion 20, the widths of the through slot 201 and/or the notch 202 in the middle of the heating trace 21 are larger than the widths of the through slot 201 and/or the notch 202 at the two ends of the heating trace 21.

According to the thermal radiation principle, the temperature in the middle of the heating portion 20 is higher than the temperature at the two ends of the heating portion 20. Therefore, by arranging the widths of the through slot 201 and/or the notch 202 in the middle of the heating trace 21 larger than the widths of the through slot 201 and/or the notch 202 at the two ends of the heating trace 21, so that the spacing in the middle of the heating trace 21 is larger and the spacing in the two ends of the heating trace 21 is smaller, thereby the overall heating capacity of the heating portion 20 is more uniform.

Figure 10:
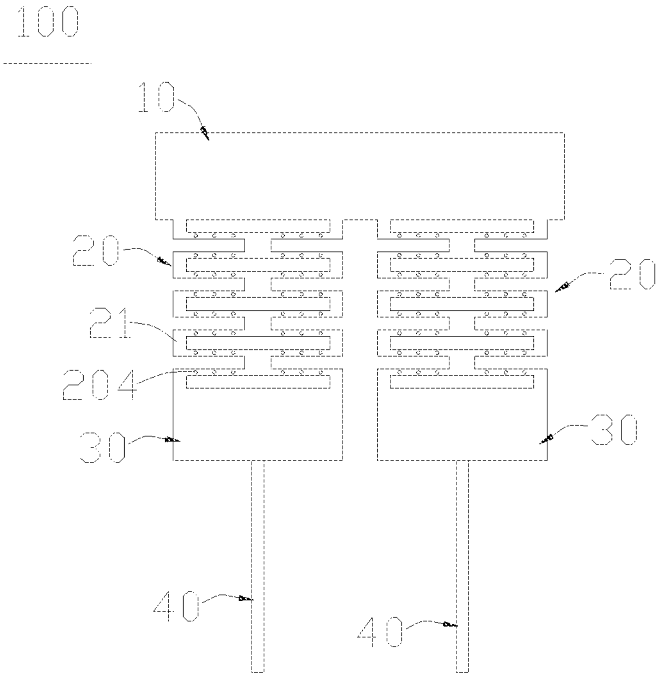
FIG. 10 is a structural diagram of a tubular heating assembly when unfolded in a fifth embodiment of the present invention.

In the fifth embodiment of the tubular heating assembly 100, as shown in FIG. 10, the tubular heating assembly 100 includes an annular connecting portion 10, at least two heating portions 20, at least two electrode portions 30, and electrode leads 40 connected to the electrode portions 30.

In the axial direction of the whole heating assembly, the connecting portion 10 and the electrode portion 30 are respectively located on the two opposite ends thereof, and the heating portion 20 is located in the middle and connected between the connecting portion 10 and the electrode portion 30. The connecting portion 10 has two opposite annular end surfaces, the heating portion 20 is connected with one end surface of the connecting portion 10, and is arranged around the end surface. The at least two heating portions 20 are spaced (not connected). The electrode portion 30 is connected to the end of the heating portion 20 away from the connecting portion 10. The electrode portions 30 are also spaced and respectively correspond to the positive and negative electrodes. Each electrode portion 30 is connected with an electrode lead 40 for connecting the positive or negative electrode of the battery or other power supply. The at least two heating portions 20 are connected in series through the connecting portion 10, so as to connect the external power supply in series, and the resistance value can be higher than that of other heating elements of the same volume.

The heating portion 20 is provided with a hollow structure, so that a heating structure such as a heating trace 21 is formed on the heating portion 20, the heating trajectory is long and the heating area is reduced, and the resistance is larger compared with the connecting portion 10 and the electrode portion 30, so that more heat is generated when powered on. In addition, the heating value of the heating trace 21 can be adjusted by adjusting its width, spacing, etc.

By arranging the hollow structure, one or more heating traces 21 may be formed on each heating portion 21, which may refer to the first to third embodiments above for details. The widths of the through slots and/or the notches on the heating portion 21 may be uniform or non-uniform, which may refer to the first to third embodiments, or the fourth embodiment for details, and will not be repeated here.

Different from the first to fourth embodiments above, in this embodiment, the heating trace 21 is provided with a plurality of spaced through holes 204. The arrangement of the through holes 204 increases the surface area of the heating trace 21, so that the heating trace 21 has a higher thermal efficiency and a faster heat dissipation.

Figure 11:
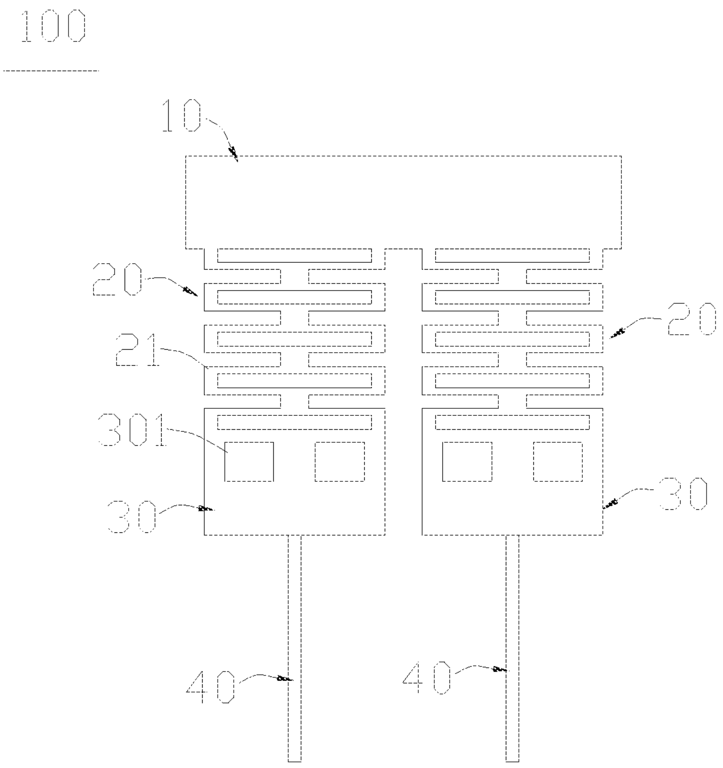
FIG. 11 is a structural diagram of a tubular heating assembly when unfolded in a sixth embodiment of the present invention.

As shown in FIG. 11, in the sixth embodiment of the tubular heating assembly 100, the tubular heating assembly 100 includes an annular connecting portion 10, at least two heating portions 20, at least two electrode portions 30, and electrode leads 40 connected to the electrode portions 30.

In the axial direction of the whole heating assembly, the connecting portion 10 and the electrode portion 30 are respectively located on the two opposite ends thereof, and the heating portion 20 is located in the middle and connected between the connecting portion 10 and the electrode portion 30. The connecting portion 10 has two opposite annular end surfaces, the heating portion 20 is connected with one end surface of the connecting portion 10, and is arranged around the end surface. The at least two heating portions 20 are spaced (not connected). The electrode portion 30 is connected to the end of the heating portion 20 away from the connecting portion 10. The electrode portions 30 are also spaced and respectively correspond to the positive and negative electrodes. Each electrode portion 30 is connected with an electrode lead 40 for connecting the positive or negative electrode of the battery or other power supply. The at least two heating portions 20 are connected in series through the connecting portion 10, so as to connect the external power supply in series, and the resistance value can be higher than that of other heating elements of the same volume.

The heating portion 20 is provided with a hollow structure, so that a heating structure such as a heating trace 21 is formed on the heating portion 20, the heating trajectory is long and the heating area is reduced, and the resistance is larger compared with the connecting portion 10 and the electrode portion 30, so that more heat is generated when powered on. In addition, the heating value of the heating trace 21 can be adjusted by adjusting its width, spacing, etc.

The specific arrangements of the hollow structure and the heating trace 21, etc., on the heating portion 20, may refer to the first to fourth embodiments above, and will not be repeated here.

In this embodiment, the electrode portion 30 is provided with at least one hollow portion 301. The hollow portion 301 may be a through-hole structure in the shape of polygon, circle, ellipse, or the like. The hollow portion 301 is preferably arranged on the end of the electrode portion 30 adjacent to the heating portion 20.

Considering that the heat of the heating portion 20 will be transmitted to the electrode portion 30, resulting in a high temperature at the installation position of the electrode portion 30, therefore, the hollow portion 301 is arranged on the electrode portion 30 to reduce its thermal conductivity area, which can play a good role in heat insulation, so that the temperature difference in the electrode portion 30 is smaller compared to the heating portion 20.

Figure 12:
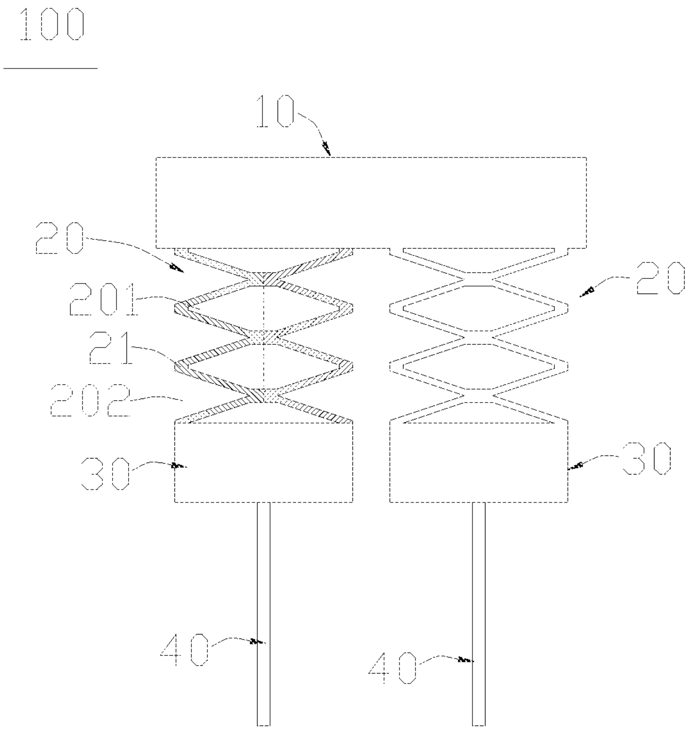
FIG. 12 is a structural diagram of a tubular heating assembly when unfolded in a seventh embodiment of the present invention.

As shown in FIG. 12, in the seventh embodiment of the tubular heating assembly 100, the tubular heating assembly 100 includes an annular connecting portion 10, at least two heating portions 20 connected to one end surface of the connecting portion 10 and arranged around the end surface, and electrode portions 30 connected to one end of the heating portions 20 away from the connecting portion 10.

Each side of the two opposite sides of the heating portion 20 faces to the corresponding side of its adjacent other heating portion 20 with has a therebetween. The at least two heating portion 20 are connected in series through connecting portion 10. Each heating portion 20 is connected with an electrode portion 30, so the electrode portions 30 are spaced and respectively correspond to the positive and negative electrodes. Each electrode portion 30 is connected with an electrode lead 40, which is used to connect the positive or negative electrode of a power supply such as a battery.

The heating portion 20 is provided with a hollow structure, so that a heating structure such as a heating trace 21 is formed on the heating portion 20, the heating trajectory is long and the heating area is reduced, and the resistance is larger compared with the connecting portion 10 and the electrode portion 30, so that more heat is generated when powered on. In addition, the heating value of the heating trace 21 may be adjusted by adjusting its width, spacing, etc.

In this embodiment, the hollow structure includes a plurality of through slots 201 and a plurality of notches 202 spaced along the length direction of the heating portion 20, so that the heating portion 20 forms two connected and symmetrical heating traces 21. Further, by arranging the through slot 201 to be diamond and the notch 202 to be triangle, so that each heating trace 21 is in a polyline or wave shape, and the whole heating portion 20 is in a grid shape.

Figure 13:
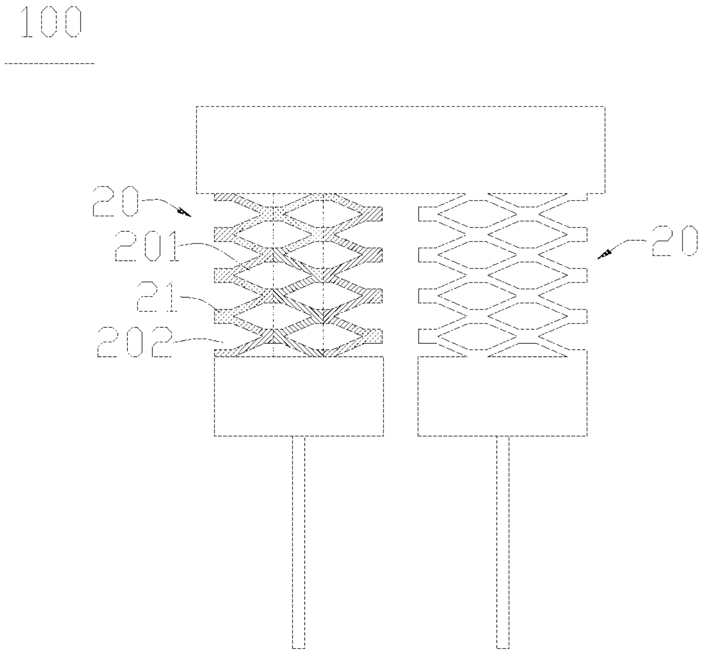
FIG. 13 is a structural diagram of a tubular heating assembly when unfolded in an eighth embodiment of the present invention.

As shown in FIG. 13, in the eighth embodiment of the tubular heating assembly 100, what is different from the seventh embodiment is that the hollow structure includes a plurality of through slots 201 and a plurality of notches 202 spaced along the length direction of the heating portion 20, so that the heating portion 20 forms three heating traces 21, wherein two heating traces 21 are spaced and symmetrical, and the other heating trace 21 is connected between the two heating traces 21. Wherein, by arranging the through slot 201 to be diamond and the notch 202 to be triangle, so that each heating trace 21 is in a broken line or wave shape, and the whole heating portion 20 is in a grid shape.

In the seventh and eighth embodiments, the spacing and the through holes of the heating trace 21, and the hollow portion on the electrode portion 30, etc., may be arranged as required, and may refer to the relevant arrangements of the first to sixth embodiments for details.

In the tubular heating assembly 100 of the first to eighth embodiments above, the electrode lead 40 is in a strip shape to form an electrode lead wire.

Figure 14:
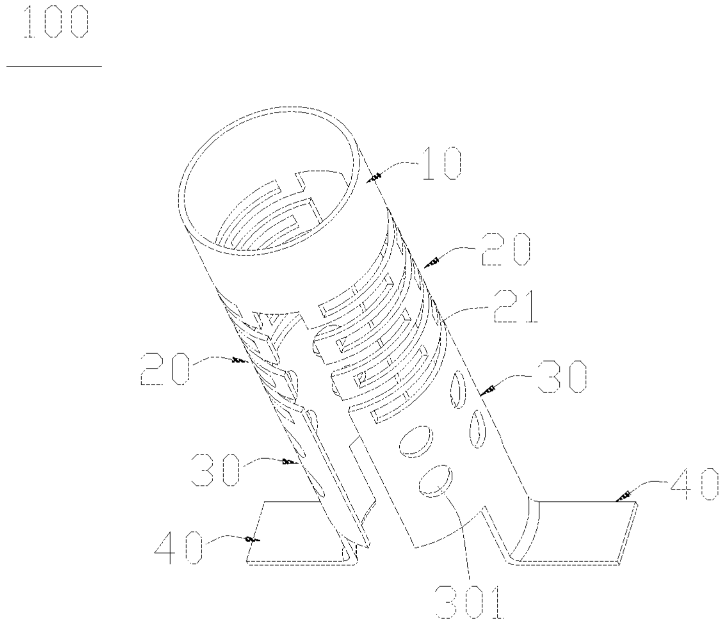
FIG. 14 is a three-dimensional structural diagram of a tubular heating assembly in a ninth embodiment of the present invention.

As shown in FIG. 14, in the ninth embodiment of the tubular heating assembly 100, the tubular heating assembly 100 includes an annular connecting portion 10, at least two heating portions 20, at least two electrode portions 30, and electrode leads 40 connected to the electrode portions 30.

In the axial direction of the whole heating assembly, the connecting portion 10 and the electrode portion 30 are respectively located on the two opposite ends thereof, and the heating portion 20 is located in the middle and connected between the connecting portion 10 and the electrode portion 30. The connecting portion 10 has two opposite annular end surfaces, the heating portion 20 is connected with one end surface of the connecting portion 10, and is arranged around the end surface. The at least two heating portions 20 are spaced (not connected). The electrode portion 30 is connected to the end of the heating portion 20 away from the connecting portion 10. The electrode portions 30 are also spaced and respectively correspond to the positive and negative electrodes. Each electrode portion 30 is connected with an electrode lead 40 for connecting to the positive or negative electrode of the battery or other power supply. The at least two heating portions 20 are connected in series through connecting portion 10, so as to connect the external power supply in series, and the resistance value can be higher than that of other heating elements of the same volume.

The heating portion 20 is provided with a hollow structure, so that a heating structure such as a heating trace 21 is formed on the heating portion 20, the heating trajectory is long and the heating area is reduced, and the resistance is larger compared with the connecting portion 10 and the electrode portion 30, so that more heat is generated when powered on. In addition, the heating value of the heating trace 21 may be adjusted by adjusting its width, spacing, etc.

As required, in this embodiment, at least one hollow portion 301 may be disposed on the electrode portion 30. By arranging the hollow portion 301 on the electrode portion 30, the thermal conductive area of the electrode portion 30 is reduced, and a good heat insulation is achieved, making the temperature difference in the electrode portion 30 smaller compared to the heating portion 20. The hollow portion 301 may be a through-hole structure in the shape of polygon, circle, ellipse, or the like. The hollow portion 301 is preferably arranged on the end of the electrode portion 30 adjacent to the heating portion 20.

Different from the first to the eighth embodiments, in this embodiment, the electrode lead 40 is an electrode sheet extending outward from the end of the electrode portion 30 away from the heating portion 20. The electrode sheet may be further bent relative to the electrode portion 30 to increase the connecting area with the battery or other power supply, and may further form a support foot to play the role of fixing and supporting.

As shown in FIGS. 1 and 2, in the atomizing unit 2 of the first embodiment of the present invention, the tubular heating assembly 100 may be the tubular heating assembly 100 of any one of the first to the ninth embodiments above, and liquid conducting member 200 is wrapped around the outer periphery of the connecting portion 10, the heating portions 20 and the electrode portions 30 of the tubular heating assembly 100. The electrode leads 40 of the tubular heating assembly 100 extend out of the liquid conducting member 200 to be connected to the positive and negative poles of the power supply respectively.

Similarly, in the atomizing unit 2 of the second embodiment of the present invention, the tubular heating assembly 100 may be the tubular heating assembly 100 of any one of the first to the ninth embodiments above. As shown in FIGS. 3 and 5, further, in the atomizing unit 2 of this embodiment, the liquid conducting member 200 includes a liquid conducting tubular body 210 and an annular step 220 projecting on the outer periphery of one end of the liquid conducting tubular body 210. The liquid conducting tubular body 210 extends in the tubular heating assembly 100, and the electrode portion 30 of the tubular heating assembly 100 is abutted against the annular step 220 or partially embedded in the annular step 220. The liquid conducting tubular body 210 in the tubular heating assembly 100 may be abutted against the inner peripheral surface of the tubular heating assembly 100, or the outer peripheral surface of the liquid conducting tubular body 210 may be embedded on the inner peripheral surface of the tubular heating assembly 100.

In the atomizing unit 2 of the present invention, the liquid conducting member 200 may be a flexible porous liquid conducting member, such as a liquid conducting cotton. The liquid conducting member 200 may alternatively be a rigid porous liquid conducting member, such as a porous ceramic liquid conducting member.

When the liquid conducting member 200 is a flexible porous liquid conducting member, in order to avoid the bending deformation of the liquid conducting member 200 when the liquid conducting member 200 is wrapped around the tubular heating assembly 100, a supporting assembly may be provided to support and position the tubular heating assembly 100.

Figure 15:
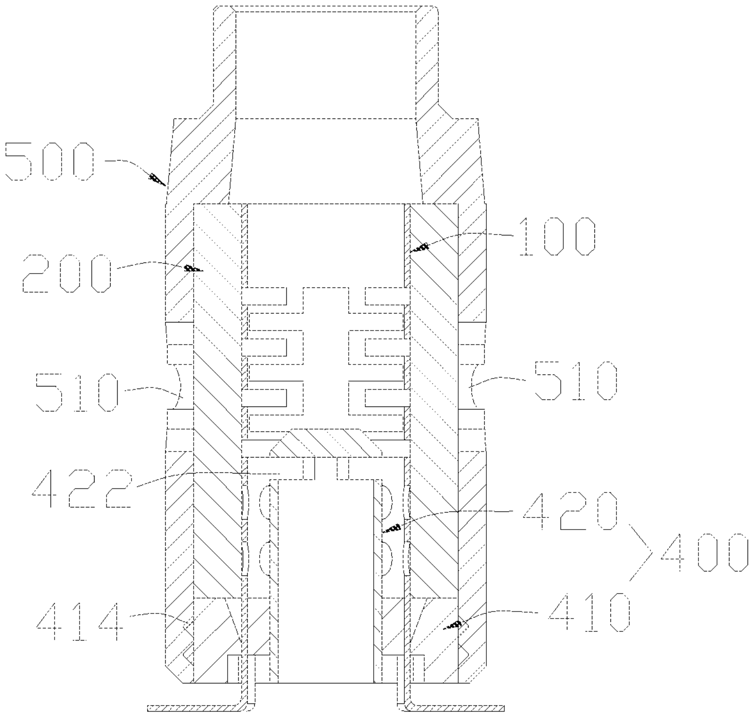
FIG. 15 is a sectional view of an atomizing unit in a third embodiment of the present invention.
Figure 16:
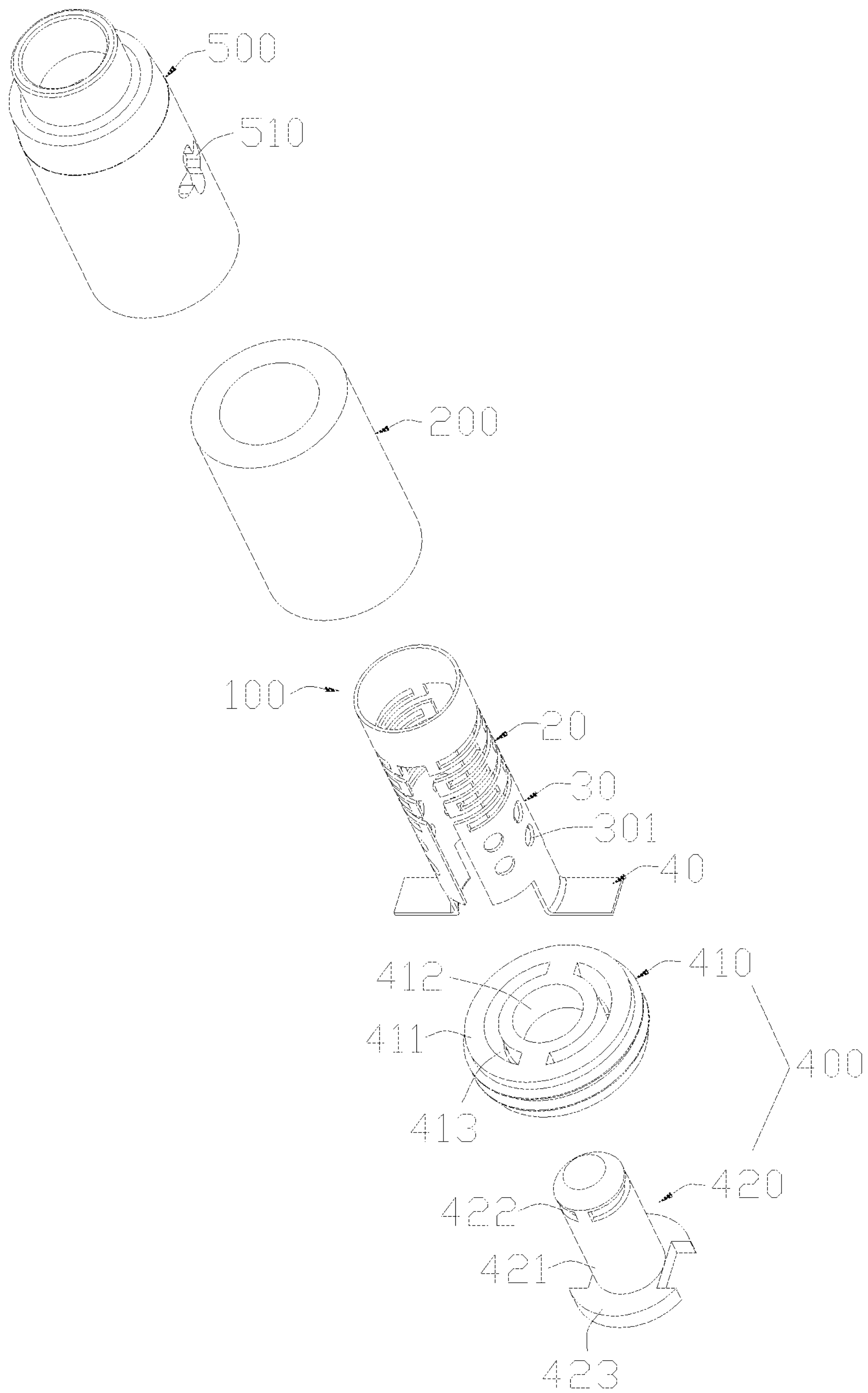
FIG. 16 is an exploded view of the atomizing unit in the third embodiment of the present invention.

As shown in FIGS. 15 and 16, the atomizing unit 2 in the third embodiment of the present invention further includes a supporting assembly 400 configured for supporting the tubular heating assembly 100, compared with the atomizing unit 2 of the first embodiment and the second embodiment.

The supporting assembly 400 includes a supporting base 410 and a supporting member 420, the supporting base 410 is sleeved on the electrode portion 30 of the tubular heating assembly 100, and the supporting member 420 extends into the tubular heating assembly 100 and is inserted in the supporting base 410. The liquid conducting member 200 is wrapped around the outer periphery of the tubular heating assembly 100 and abutted on the supporting base 410.

The supporting base 410 may include a base body 411, and the base body 411 is provided with a central through hole 412 that runs through its two opposite surfaces, and at least two perforations 413 that are spaced and surround the outer periphery of the central through hole 412. One end of the supporting member 420 is inserted into the central through hole 412, each electrode portion 30 of the tubular heating assembly 100 is inserted into a corresponding hole 413, and the electrode lead 40 of the tubular heating assembly 100 passes through the perforation 413 to expose out of the lower end of the base body 411. The perforation 413 may be a structure with wide upper end and narrow lower end, for example, a structure with widths gradually decreased from one end to another opposite end, which can guide the electrode portion 30 penetrating through the perforation 413.

The supporting base 410 is preferably made of silica gel, which can be compressed to achieve close fit sealing and insulation. The supporting member 420 is preferably made of insulating hard material, such as ceramics, plastics, or the like.

The main body of the supporting member 420 is columnar, positioned on the supporting base 410 and arranged in the tubular heating assembly 100, to avoid the problem of deformation caused by the gap between the heating portions 20 in the tubular heating assembly 100. The height of the supporting member 420 in the tubular heating assembly 100 may be at the junction of the electrode portion 30 and the heating portion 20, or to the end of the heating portion 20, whichever does not affect the heating effect of the heating portion 20.

In addition, in order to ensure airflow circulation, the side wall of the supporting member 420 may be hollowed or reticulated, or a through hole may be arranged on the side wall.

In this embodiment, as shown in FIGS. 15 and 16, the supporting member 420 includes a barrel body 421 with one end open and the other opposite end closed, and may further include a barrel seat 423 connected to the outer periphery of the open end of the barrel body 421. The open end of the barrel body 421 is inserted in the central through hole 412 of the supporting base 410 and located at the inner side of the electrode portion 30 of the tubular heating assembly 100. The barrel seat 423 is fitted to the bottom surface of the supporting base 410 to prevent the barrel body 421 from falling out of the supporting base 410. The closed end of the barrel body 421 is in the tubular heating assembly 100 and faces the heating portion 20, and is located in the junction of the electrode portion 30 and the heating portion 20 or in the end of the heating portion 20.

The side wall of the closed end of the barrel body 421 is provided with at least one vent hole 422 to communicate the atomization passage of the tubular heating assembly 100 with the internal passage of the barrel body 421, and the atomization passage of the tubular heating assembly 100 is communicated with the external air through the open end of the barrel body 421 to ensure the airflow circulation. The arrangement of the vent hole 422 on the side wall of the closed end of the barrel body 421 improves the gas inlet into the tubular heating assembly 100, effectively preventing the condensed liquid formed by the condensation of the atomized steam during the atomization of the atomizing unit 2 from leaking out of the vent hole 422. During the atomization process, the condensed liquid formed by the condensation of the atomized steam can be accumulated in the annular space between the supporting base 410, the barrel body 421 and the electrode portion 30, and then adsorbed by the liquid conducting member 200 through the hollow portion 301 arranged on the electrode portion 30 to be reused.

In addition, the arrangement of the vent hole 422 on the side wall of the closed end of the barrel body 421 can also cause the incoming airflow to change direction and blow to the inner surface of the heating portion 20, which can take away the high-temperature atomized steam, and meanwhile, the temperature of the incoming air is lower, so that the heating portion 20 can dissipate heat more quickly and the problem of heat accumulation during continuous operation is avoided. Further, the atomizing unit 2 in this embodiment further includes a sleeve 500 sleeved around the liquid conducting member 200 and the supporting member 420. The side wall of the sleeve 500 is provided with at least one liquid conducting hole 510 that runs through the inner and outer wall surfaces of the sleeve 500. The liquid conducting hole 510 communicates the liquid conducting member 200 with the liquid storage chamber disposed externally to realize liquid transmission.

At least one convex sealing ring 414 may be arranged on the outer periphery of the supporting base 420, which is closely matched with the inner wall surface of the sleeve 500 to play a sealing role.

Figure 17:
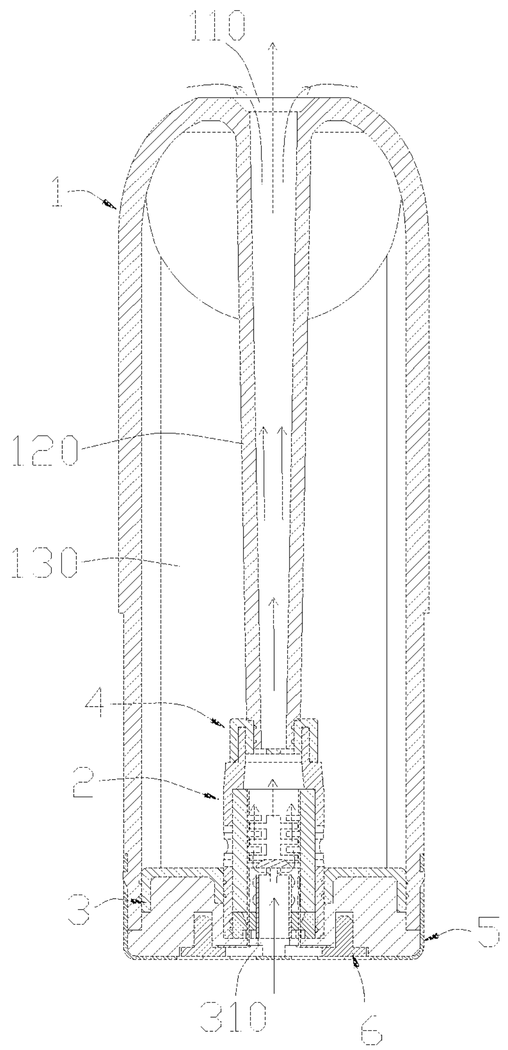
FIG. 17 is a sectional view of an atomizing device in an embodiment of the present invention.
Figure 18:
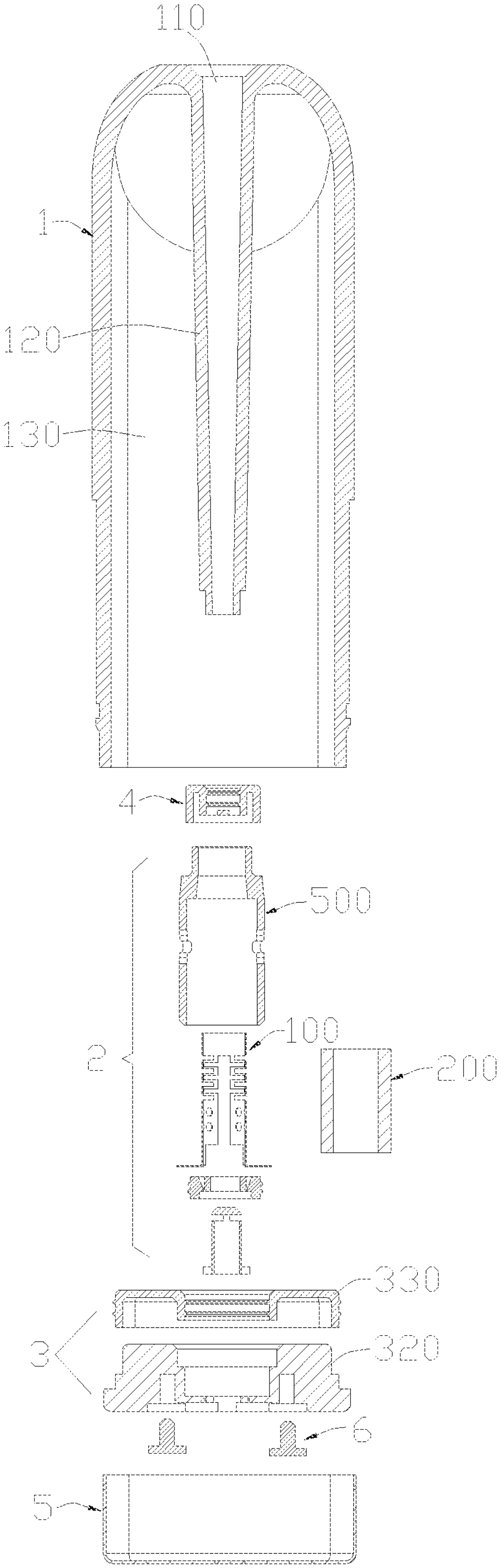
FIG. 18 is an exploded view of the atomizing device shown in FIG. 17.

As shown in FIGS. 17 and 18, an atomizing device in an embodiment of the present invention includes a hollow shell 1, an atomizing unit 2 arranged in the shell 1, and a base 3 matched with the shell 1.

The shell 1 may be a hollow shell in the shape of a cylinder or a flat. One end of the shell 1 is provided with an air outlet 110, and the opposite end is opened to form an open end. The shell 1 is provided with an air duct 120 therein, and the air duct 120 extends along the length direction (or axial direction) of the shell 1, one end of the air duct 120 is communicated with the air outlet 110, and the opposite end of the air duct 120 is spaced toward the open end. The internal passage of the air duct 120 forms an air guide passage, which is communicated with the air outlet 110. The air duct 120 may be integrally formed in the shell 1, or may be separately manufactured and assembled therein. A liquid storage chamber 130 located at the outer periphery of the air duct 120 is provided in the shell 1, which is used to store the atomized liquid to be heated and atomized.

The base 3 is fitted to the open end of the shell 1 to seal the open end. The atomizing unit 2 is arranged in the shell 1 and inserted in the base 3, and is connected to the air duct 120, so that the atomizing unit 2 is positioned between the air duct 120 and the base 3. The air duct 120 is communicated with the atomizing unit 42, and the base 3 is provided with an air inlet 310 communicated with the atomizing unit 2. Specifically, the passage defined by the inner periphery of the atomizing unit 2 forms the atomization passage, which is respectively communicated with the inner passage of the air duct 120 and the air inlet 310. The liquid storage chamber 130 located on the outer periphery of the air duct 120 is in fluid communication with the liquid conducting member 200 of the atomizing unit 2, so that the atomized liquid stored in the liquid storage chamber 130 is adsorbed by the liquid conducting member 200 and conducted to the tubular heating assembly 100 of the atomizing unit 2, to be heated and atomized to generate smoke, which is then output through the atomization passage and the air outlet 110, where the output direction is shown by the arrows in FIG. 17.

Figure 19:
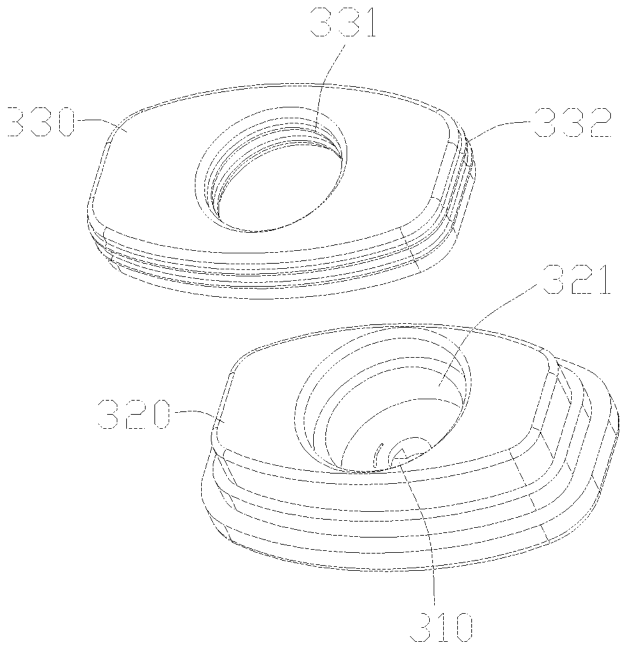
FIG. 19 is an exploded view of the base in FIG. 18.

The base 3 is arranged corresponding to the open end of the shell 1. As shown in FIGS. 18 and 19, in this embodiment, the base 3 includes a hard foundation base 320 and a sealing base 330 matched with the foundation base 320. The foundation base 320 may be assembled to the open end of the shell 1 by means of interference fit, etc. The sealing base 330 is sleeved on the foundation base 320 to play a sealing role through its own flexibility and compressibility.

The foundation base 320 is provided with an installation slot 321 that is inward concave, and the atomizing unit 2 is inserted into the installation slot 321. The air inlet 310 is arranged on the bottom surface of the installation slot 321 and penetrates through the bottom surface.

The sealing base 330 is sleeved on the foundation base 320, with a structural shape corresponding to the upper portion of the foundation base 320, for example, with one side extending along the inner peripheral surface of the installation slot 321 of the foundation base 320, and another side extending along the outer peripheral surface of the foundation base 320. The side surface of the sealing base 330 located in the installation slot 321 is provided with at least one protruding first sealing rib 331, which is configured to be closely fitted with the outer surface of the atomizing unit 2 to achieve the sealing effect. The sealing base 330 is provided with at least one protruding second sealing rib 332 at the side of the outer circumference of the foundation base 320, which is used for tight matching with the inner wall surface of the shell 1 to achieve the sealing effect.

The atomizing unit 2 may be the atomizing unit 2 in the first embodiment shown in FIGS. 1 and 2 or the second embodiment shown in FIGS. 3 and 4, or may alternatively be the atomizing unit 2 in the third embodiment shown in FIGS. 15 and 16.

Taking the atomizing unit 2 in the third embodiment as an example, in the shell 1, one end of the air duct 120 toward the atomizing unit 2 is inserted on the sleeve 500 of the atomizing unit 2, and the inner passage of the air duct 120 is communicated with the atomization passage defined by the inner periphery of the tubular heating assembly 100 through the sleeve 500. The end of the atomizing unit 2 toward the base 3 is in a seal fit with the inner wall surface of the installation slot 321 and the first sealing rib 331 of the sealing base 330 through the outer peripheral surface of the sleeve 500.

Further, the atomizing device of the present invention may further include a sealing seat 4, which is fitted between the atomizing unit 2 and the air duct 120 to achieve gap sealing. Specifically, as shown in FIGS. 17 and 18, in this embodiment, the sealing seat 4 is fitted on the sleeve 500 of the atomizing unit 2 and seals the fitting gap between the atomizing unit 2 and the air duct 120.

The sealing base 330 and the sealing seat 4 may be made of silica gel or other high-temperature resistant insulating material, respectively.

In order to improve the appearance integrity of the atomizing device, the atomizing device of the present invention may further include a bottom case 5. The bottom case 5 is sleeved outside the base 3 and connected with the shell 1, to form an integral housing with the shell 1. The bottom case 5 may be made of the same material as the shell 1, such as metal.

The atomizing device of the present invention further includes two electrodes 6 inserted on the base 3. The electrodes 6 are electrically connected with the electrode portions 30 of the tubular heating assembly 100 in the atomizing unit 2.

Specifically, the foundation base 320 of the base 3 is provided with insertion slots for the electrodes 6 to be inserted therein. When the atomizing unit 2 is inserted and positioned on the base 3, the electrode lead 40 of the tubular heating assembly 100 passes through the bottom surface of the installation slot 321 of the foundation base 320 and then is exposed on the bottom surface of the foundation base 320 or is penetrated into the foundation base 320, to be electrically connected with the electrode 6 inserted on the foundation base 320 to conduct the electrode portion 30 and the electrode 6.

The electrode 6 and the electrode lead 40 may be connected and conducted through full contact with sufficient area, or may be further fixed together by welding.

When assembling the atomizing device of the present invention, the atomizing unit 2 may be assembled to the base 3 first, then the electrode lead 40 of the tubular heating assembly 100 is bent to the bottom surface of the base 3, the electrode 6 is installed into the base 3 to be contacted with the electrode lead 40, and then the sealing seat 4 is sleeved on the atomizing unit 2. Then the assembled module is installed into the shell 1, the base 3 is fitted at the open end of the shell 1, and finally the bottom case 5 is sleeved outside the base 3 and connected to the end of the shell 1 to form a complete atomizing device, which is simple to assemble and convenient for automatic production.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

What is claimed is:

1. An atomizing unit (2), comprising:

a tubular heating assembly (100); and a liquid conducting member (200);

wherein the liquid conducting member (200) is wrapped around an outer periphery of the tubular heating assembly (100) or fitted to an inner peripheral surface of the tubular heating assembly (100);

wherein the tubular heating assembly (100) comprises an annular connecting portion (10), at least two heating portions (20) connected to one end surface of the connecting portion (10) and arranged around the end surface, and electrode portions (30) connected to one end of the heating portions (20) away from the connecting portion (10);

wherein each side of two opposite sides of one heating portion (20) faces to a corresponding side of its adjacent heating portion (20) with a gap (50) therebetween; and wherein the at least two heating portions (20) are connected in series through the connecting portion (10).

2. The atomizing unit of claim 1, wherein each heating portion (20) is provided with a hollow structure, and wherein the hollow structure comprises a plurality of through slots (201) and/or a plurality of notches (202) spaced along a length direction of the heating portion (20), to enables the heating portion (20) to form at least one heating trace (21).

3. The atomizing unit of claim 2, wherein the heating trace (21) is in a circuitous bent shape, a polyline shape or a wave shape.

4. The atomizing unit of claim 2, wherein in the length direction of the heating portion (20), the widths of the through slot (201) and/or the notch (202) located in the middle of the heating trace (21) are larger than the widths of the through slot (201) and/or the notch (202) located at two ends of the heating trace (21).

5. The atomizing unit of claim 2, wherein the heating trace (21) is provided with a plurality of spaced through hole (204).

6. The atomizing unit of claim 1, wherein the electrode portions (30) are provided with at least one hollow portion (301).

7. The atomizing unit of claim 1, wherein the tubular heating assembly (100) further comprises electrode leads connected to the electrode portions (30).

8. The atomizing unit of claim 1, wherein the liquid conducting member (200) comprises a liquid conducting tubular body (210), and an annular step (220) projecting on an outer periphery of one end of the liquid conducting tubular body (210);

wherein the liquid conducting tubular body (210) extends in the tubular heating assembly (100), and the electrode portions (30) of the tubular heating assembly (100) are abutted against the annular step (220) or partially embedded in the annular step (220).

9. The atomizing unit of claim 1, further comprising:

a supporting assembly (400) supporting the tubular heating assembly (100);

wherein the supporting assembly (400) comprises a supporting base (410) and a supporting member (420), wherein the supporting base (410) is sleeved on the electrode portions (30) of the tubular heating assembly (100), and the supporting member (420) extends in the tubular heating assembly (100) and is inserted on the supporting base (410); and wherein the liquid conducting member (200) is wrapped around the outer periphery of the tubular heating assembly (100) and abutted on the supporting base (410).

10. The atomizing unit of claim 9, wherein the supporting base (410) comprises a base body (411), wherein the base body (411) is provided with a central through hole (421) running through two opposite surfaces thereof, and at least two perforations (413) spaced and surrounding an outer periphery of the central through hole (412); and wherein one end of the supporting member (420) is inserted in the central through hole (412), and each electrode portion (30) is inserted in the corresponding perforation (413).

11. The atomizing unit of claim 9, wherein the supporting member (420) comprises a barrel body (421) with an open end and a closed end opposite to the open end;

wherein the open end of the barrel body (421) is inserted in the central through hole (412) of the supporting base (410) and is located in the electrode portions (30) of the tubular heating assembly (100);

wherein the closed end of the barrel body (421) is in the tubular heating assembly (100) and faces the heating portions (20), and is located in the junction of the electrode portion (30) and the heating portion (20) or in an end of the heating portion (20);

wherein a side wall of the closed end of the barrel body (421) is provided with at least one vent hole (422) configured to communicate an atomization passage of the tubular heating assembly (100) with an internal passage of the barrel body (421).

12. The atomizing unit of claim 9, further comprising:

a sleeve (500) sleeved around the liquid conducting member (200) and the supporting base (420);

wherein a side wall of the sleeve (500) is provided with at least one liquid conducting hole (510) that runs through an inner wall surface and an outer wall surface thereof.

13. An atomizing device, comprising:

an atomizing unit (2);

a shell (1) that is hollow; and a base (3);

wherein the atomizing unit (2) comprises:

a tubular heating assembly (100); and a liquid conducting member (200);

wherein the liquid conducting member (200) is wrapped around an outer periphery of the tubular heating assembly (100) or fitted to an inner peripheral surface of the tubular heating assembly (100);

wherein the tubular heating assembly (100) comprises an annular connecting portion (10), at least two heating portions (20) connected to one end surface of the connecting portion (10) and arranged around the end surface, and electrode portions (30) connected to one end of the heating portions (20) away from the connecting portion (10);

wherein each side of two opposite sides of one heating portion (20) faces to a corresponding side of its adjacent heating portion (20) with a gap (50) therebetween; and wherein the at least two heating portions (20) are connected in series through the connecting portion (10);

wherein one end of the shell (1) is provided with an air outlet (110), and another opposite end of the shell (1) is opened to form an open end;

wherein the base (3) is fitted to the open end of the shell (1), and the atomizing unit (2) is disposed in the shell (1) and inserted on the base (3);

wherein the shell (1) is provided therein with an air duct (120) communicated between the air outlet (110) and the atomizing unit (2), and a liquid storage chamber (130) located on an outer periphery of the air duct (120) and in fluid communication with the liquid conducting member (200) of the atomizing unit (2).

14. The atomizing device of claim 13, wherein the base (3) comprises a foundation base (320) that is hard and a sealing base (330) matched with the foundation base (320);

wherein the foundation base (320) is provided with an installation slot (321) that is inward concave, and an air inlet (310) penetrating a bottom surface of the installation slot (321);

wherein the atomizing unit (2) is inserted in the installation slot (321);

wherein the sealing base (330) is sleeved on the foundation base (320), and wherein a side surface of the sealing base (330) located in the installation slot (321) is provided with at least one protruding first sealing rib (331), and a side surface of the sealing base (330) located at an outer circumference of the foundation base (320) is provided with at least one protruding second sealing rib (332).

15. The atomizing device of claim 13, further comprising: a sealing seat (4);

wherein an end of the air duct (120) facing the atomizing unit (2) is inserted on an end of the atomizing unit (2) facing the air outlet (110), and wherein the sealing seat (4) is fitted to the end of the atomizing unit (2) facing the air outlet (110), and seals a matching gap between the atomizing unit (2) and the air duct (120).

16. The atomizing device of claim 13, further comprising: a bottom case (5);

wherein the bottom case (5) is sleeved outside the base (3) and connected with the shell (1), to form an integral housing together with the shell (1).

17. The atomizing device of claim 13, further comprising: two electrodes (6) inserted on the base (3);

wherein the electrodes (6) are electrically connected with the electrode portions (30) of the atomizing unit (2).

18. The atomizing device of claim 13, wherein each heating portion (20) is provided with a hollow structure, and wherein the hollow structure comprises a plurality of through slots (201) and/or a plurality of notches (202) spaced along a length direction of the heating portion (20), to enables the heating portion (20) to form at least one heating trace (21).

19. The atomizing device of claim 13, wherein the liquid conducting member (200) comprises a liquid conducting tubular body (210), and an annular step (220) projecting on an outer periphery of one end of the liquid conducting tubular body (210);

wherein the liquid conducting tubular body (210) extends in the tubular heating assembly (100), and the electrode portions (30) of the tubular heating assembly (100) are abutted against the annular step (220) or partially embedded in the annular step (220).

20. The atomizing device of claim 13, wherein the atomizing unit (2) further comprises:

a supporting assembly (400) supporting the tubular heating assembly (100);

wherein the supporting assembly (400) comprises a supporting base (410) and a supporting member (420), wherein the supporting base (410) is sleeved on the electrode portions (30) of the tubular heating assembly (100), and the supporting member (420) extends in the tubular heating assembly (100) and is inserted on the supporting base (410); and wherein the liquid conducting member (200) is wrapped around the outer periphery of the tubular heating assembly (100) and abutted on the supporting base (410).

* * * * *